US012781738B2

(12) United States Patent
Davidson et al.

(10) Patent No.: US 12,781,738 B2
(45) Date of Patent: Nov. 3, 2026

(54) METHODS FOR MEASURING FLUID FLOW OF FLUID SUPPLY ASSEMBLY

(71) Applicant: Valco Cincinnati, Inc., Cincinnati, OH (US)

(72) Inventors: Dan Davidson, Cincinnati, OH (US); Todd Jonas, Cincinnati, OH (US)

(73) Assignee: VALCO CINCINNATI, INC., Cincinnati, OH (US)

( * ) Notice: Subject to any disclaimer, the term of this patent is extended or adjusted under 35 U.S.C. 154(b) by 0 days.

(21) Appl. No.: 19/246,578

(22) Filed: Jun. 23, 2025

(65) Prior Publication Data

US 2025/0314250 A1 Oct. 9, 2025

Related U.S. Application Data

(63) Continuation of application No. 18/297,098, filed on Apr. 7, 2023, now Pat. No. 12,378,959.

(60) Provisional application No. 63/328,496, filed on Apr. 7, 2022.

(51) Int. Cl.

*F04C 14/28* (2006.01)
*F04C 2/18* (2006.01)
*G01F 25/10* (2022.01)

(52) U.S. Cl.

CPC ................ *F04C 14/28* (2013.01); *F04C 2/18* (2013.01); *G01F 25/10* (2022.01); *F04C 2220/24* (2013.01); *F04C 2270/18* (2013.01); *F04C 2270/185* (2013.01); *F04C 2270/20* (2013.01)

(58) Field of Classification Search

CPC ........ F04C 14/28; F04C 2/18; F04C 2220/24; F04C 2270/18; F04C 2270/185; F04C 2270/20; G01F 25/10

See application file for complete search history.

(56) References Cited

U.S. PATENT DOCUMENTS 4,546,648 A * 10/1985 Abt ........................ G01F 17/00 73/114.48
4,646,648 A 3/1987 Lindbom et al.
5,244,367 A * 9/1993 Aslin ........................ B67D 7/02 418/104
5,423,661 A * 6/1995 Gabeler .............. F04C 15/0069 418/188
2011/0111506 A1 5/2011 Zuppiger
2012/0150383 A1* 6/2012 Douglas .................. F04B 51/00 701/31.1
2018/0126203 A1* 5/2018 Beluse ................ B05B 12/1436

(Continued)

*Primary Examiner* — Bryan M Lettman

(74) *Attorney, Agent, or Firm* — Dinsmore & Shohl LLP

(57) ABSTRACT

A method of measuring fluid flow in a system includes providing a fluid supply assembly which includes a fluid supply supplying fluid, a dispensing valve from which the fluid is dispensed, a dispensing line connecting the fluid supply to the dispensing valve, a gear pump including a motor and a gear being rotated by the motor to provide a flow of fluid from the fluid supply to the dispensing line, a revolution counter counting a number of revolutions of an element of the gear pump, a pressure transducer coupled to the dispensing line sensing pressure in the system, and a controller including a processor and a memory to control the system. The method further includes directing fluid from the fluid supply, rotating the gear to provide the flow of fluid from the fluid supply to the dispensing line, and providing a calibration process by modulating the gear pump.

19 Claims, 4 Drawing Sheets

(56) References Cited

U.S. PATENT DOCUMENTS

2019/0024547 A1* 1/2019 Gustafson ............... F04C 14/00
2023/0250820 A1* 8/2023 Afshari ..................... F04C 2/18
417/2

* cited by examiner

METHODS FOR MEASURING FLUID FLOW OF FLUID SUPPLY ASSEMBLY

CROSS-REFERENCE TO RELATED APPLICATION

This application is a continuation of U.S. patent application Ser. No. 18/297,098, filed Apr. 7, 2023, titled "Methods for Measuring Fluid Flow of Fluid Supply Assembly" which claims priority to U.S. Provisional Patent Application No. 63/328,496, filed Apr. 7, 2022, titled "Methods for Measuring Fluid Flow of Fluid Supply Assembly," the disclosures of which are incorporated by reference herein in their entireties.

BACKGROUND

Maintaining quality of packaged products requires, among other measures, ensuring that the package has the proper amount of adhesive applied. Because the appropriate quantity is often controlled by the judgment of operators using their eyes and estimates, the volume is often altered unnecessarily and adhesive is either over- or under-applied. Further, there is rarely a controllable way to program dispensing equipment to apply the appropriate weight of adhesive. Further, efforts to control the volume of adhesive are usually undertaken by adjusting pressure, pump speed, nozzle size, etc. All of these factors may contribute to adhesive quantity, but are only indirectly related to weight or volume of adhesive applied.

The inaccuracy in application of the fluid may increase the cost of running the fluid supply assembly, or lower the quality of products. For example, if fluid is over applied, the cost of running the fluid supply assembly may increase. The fluid may be one of the high cost components in a packaging, converting, assembly or other manufacturing process. If insufficient or no fluid is applied, the fluid supply assembly may not provide products proper sealing or other functions expected to be provided. Therefore, measuring and directly controlling how much fluid is applied may assist users with knowing or saving the cost of fluid applied or ensuring quality of products.

Traditional methods of measuring the quantity of fluid applied include weighing the product after application and measuring the applied fluid quantity based on a known weight of the product without the fluid and using flow meters to physically measure the fluid passing through a line to the application valves. Another method of measuring fluid quantity is to use flow meters that are passively turned by the flow of the fluid through the line. By measuring the rotation of the flow meters, a known amount of fluid is displaced and the quantity of fluid can be recorded over time, totalized, and reported in various formats.

While the speed or rotation of the flow meters may be used to measure the quantity of fluid, there are some challenges associated with using flow meters to estimate fluid flow. While measuring the rotation of the flow meters to estimate fluid flow may work well in continuous dispensing applications (e.g., continuous application), it does not work well for intermittent applications (e.g., having intervals during application) where fluid pressure is controlled by pressure relief valves that may allow fluid to bypass and return to a fluid supply tank. Also, when the fluid is adhesive, an external standalone flow meter must normally be heated to be maintained, which may make the fluid supply assembly bulky and costly. Instead of controlling pressure with a pressure relief valve, the desired system pressure may be achieved by modulating pump speed. Flowmeters can also be used as feedback mechanisms to control adhesive application quantity, but they are expensive and require maintenance and calibration.

SUMMARY

In accordance with one embodiment of the present disclosure, a method of measuring fluid flow in a system is provided. The method includes providing a fluid supply assembly. The fluid supply assembly includes a fluid supply supplying fluid, a dispensing valve from which the fluid is dispensed, a dispensing line connecting the fluid supply to the dispensing valve, a gear pump including a motor and a gear being rotated by the motor to provide a flow of fluid from the fluid supply to the dispensing line, a revolution counter counting a number of revolutions of an element of the gear pump, a pressure transducer coupled to the dispensing line sensing pressure in the system, and a controller including a processor and a memory to control the system. The method further includes directing fluid from the fluid supply, rotating, by the motor, the gear such that to provide the flow of fluid from the fluid supply to the dispensing line, and providing a calibration process by modulating the gear pump.

In embodiments, the element of the gear pump includes at least one of the motor, the gear, and the shaft.

In embodiments, the method further includes providing the calibration process when a calibration bit is set. The calibration process includes sensing, by the pressure transducer, pressure in the system, rotating, by the motor, the gear to establish and maintain a first calibration pressure for a first calibration period, counting, by the revolution counter, a first number of revolutions of the element for the first calibration period while maintaining a first calibration pressure in the system by sensing pressure in the system while the dispensing valve is closed, rotating, by the motor, the gear to establish and maintain a second calibration pressure for a second calibration period, counting, by the revolution counter, a second number of revolutions of the element for the second calibration period while maintaining the second calibration pressure in the system by sensing pressure in the system while the dispensing valve is closed, and calculating, by the controller, a first loss based on the first number of revolutions and the first calibration pressure, and a second loss based on the second number of revolutions and the second calibration pressure.

In embodiments, the calibration process further includes rotating, by the motor, the gear to establish and maintain a third calibration pressure for a third calibration period, counting, by the revolution counter, a third number of revolutions of the element for the third calibration period while maintaining the third calibration pressure in the system by sensing pressure in the system while the dispensing valve is closed, and calculating, by the controller, a third loss based on the third number of revolutions and the third calibration pressure.

In embodiments, the calibration process further includes rotating, by the motor, the gear to establish and maintain a third calibration pressure for a third calibration period, counting, by the revolution counter, a third number of revolutions of the element for the third calibration period while maintaining the third calibration pressure in the system by sensing pressure in the system while the dispensing valve is closed, and calculating, by the controller, a third loss based on the third number of revolutions and the third calibration pressure.

In embodiments, the calibration process further includes calculating, by the controller, loss coefficients in the system based on the first loss and the second loss using a least squares best fit method.

In embodiments, the method further includes, providing an adhesive tracking process when enabled. The adhesive tracking includes resetting a total adhesive consumption and a total product count when adhesive tracking is enabled and a reset bit is set, adding an adhesive consumption and a product count to the total adhesive consumption and the total product count until an adding period ends, ignoring a number of revolutions of the element when the product count has not increased within a maximum product gap time period, calculating an average number of revolutions of the element over a past time period when the product count has increased within the maximum product gap time period, calculating a weight dispensed during the past time period based on the average number of revolutions and an average pressure in the system over the past time period, calculating a loss based on the average number of revolutions and an average pressure in the system over the past time period and the loss coefficients, converting the loss to a weight loss based on a fluid density of the fluid, and calculating an average total weight by subtracting the weight loss from the weight dispensed.

In embodiments, the adhesive tracking further includes converting the average total weight counted for the past time period to an average dispensing rate, displaying the average dispensing rate, calculating an average product count over the past time period based on the average dispensing rate, calculating an adhesive weight per a product based on the average product count and the average dispensing rate over the past time period, displaying the adhesive weight per product, adding the adhesive weight to the total adhesive consumption, and resetting the total adhesive consumption and the total product count when the adhesive tracking is enabled and the reset bit is set.

In embodiments, the system further provides a display graphically and/or numerically displaying a flow result of the system.

In embodiments, the flow result includes information calculated by the controller.

In embodiments, the display displays a result of a comparison between a first flow result and a second flow result.

In embodiments, the display displays the flow result totalized for a certain interval.

In embodiments, the controller totalizes a flow result in the system for a certain interval.

In embodiments, the controller stores the totalized flow result in the memory.

In embodiments, the controller determines whether a flow result in the system satisfies a flow standard over a period of time.

In embodiments, the controller provides a notification in response to determining the flow standard is unsatisfied.

In embodiments, the fluid supply assembly further includes a pressure relief valve coupled to the dispending line. The calibration process further includes closing the pressure relief valve when the calibration bit is set.

In accordance with another embodiment of the present disclosure, a system is provided. The system includes a fluid supply assembly including a fluid supply supplying fluid, a dispensing valve from which the fluid is dispensed, a dispensing line connecting the fluid supply to the dispensing valve, a gear pump including a motor and a gear being rotated by the motor to provide a flow of fluid from the fluid supply to the dispensing line, a revolution counter counting a number of revolutions of an element of the gear pump, a pressure transducer coupled to the dispensing line sensing pressure in the system, and a controller including a processor and a memory to control the system.

In embodiments, the element of the gear pump includes at least one of the motor, the gear, and the shaft.

In embodiments, the controller provides a calibration process when a calibration bit is set. The calibration process includes rotating, by the motor, the gear to provide the flow of fluid, sensing, by the pressure transducer, pressure in the system, rotating, by the motor, the gear to establish and maintain a first calibration pressure for a first calibration period, counting, by the revolution counter, a first number of revolutions of the element for the first calibration period while maintaining a first calibration pressure in the system by sensing pressure in the system while the dispensing valve is closed, rotating, by the motor, the gear to establish and maintain a second calibration pressure for a second calibration period, counting, by the revolution counter, a second number of revolutions of the element for the second calibration period while maintaining the second calibration pressure in the system by sensing pressure in the system while the dispensing valve is closed, and calculating, by the controller, a first loss based on the first number of revolutions and the first calibration pressure, and a second loss based on the second number of revolutions and the second calibration pressure.

In embodiments, the dispensing line and the fluid supply are fluidly coupled without a bypass line for bypassing fluid back to the fluid supply from the dispensing line.

These and additional features provided by the embodiments described herein will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments described herein may provide methods to measure fluid flow using a gear pump and use this measured flow to control the pump to a preset desired application volume. A pump driver of the gear pump may receive feedback from a pressure transducer, and use a control algorithm to adjust pump speed of the gear pump as needed to maintain the desired system pressure. For example, as the dispensing valve opens, the pressure transducer senses a drop in pressure in the system. The pump driver receives this feedback input, may increase the pump motor speed as necessary to increase flow, and bring the system pressure back to the desired level. This closed-loop method of controlling pressure does not rely on a bypass circuit to the tank, and therefore the pump revolutions can be used to estimate flow rate. The flow measuring described herein provides the user of the fluid supply assembly with an estimate of fluid consumption without the cost and complexity of a standalone flow meter.

Figure 1:
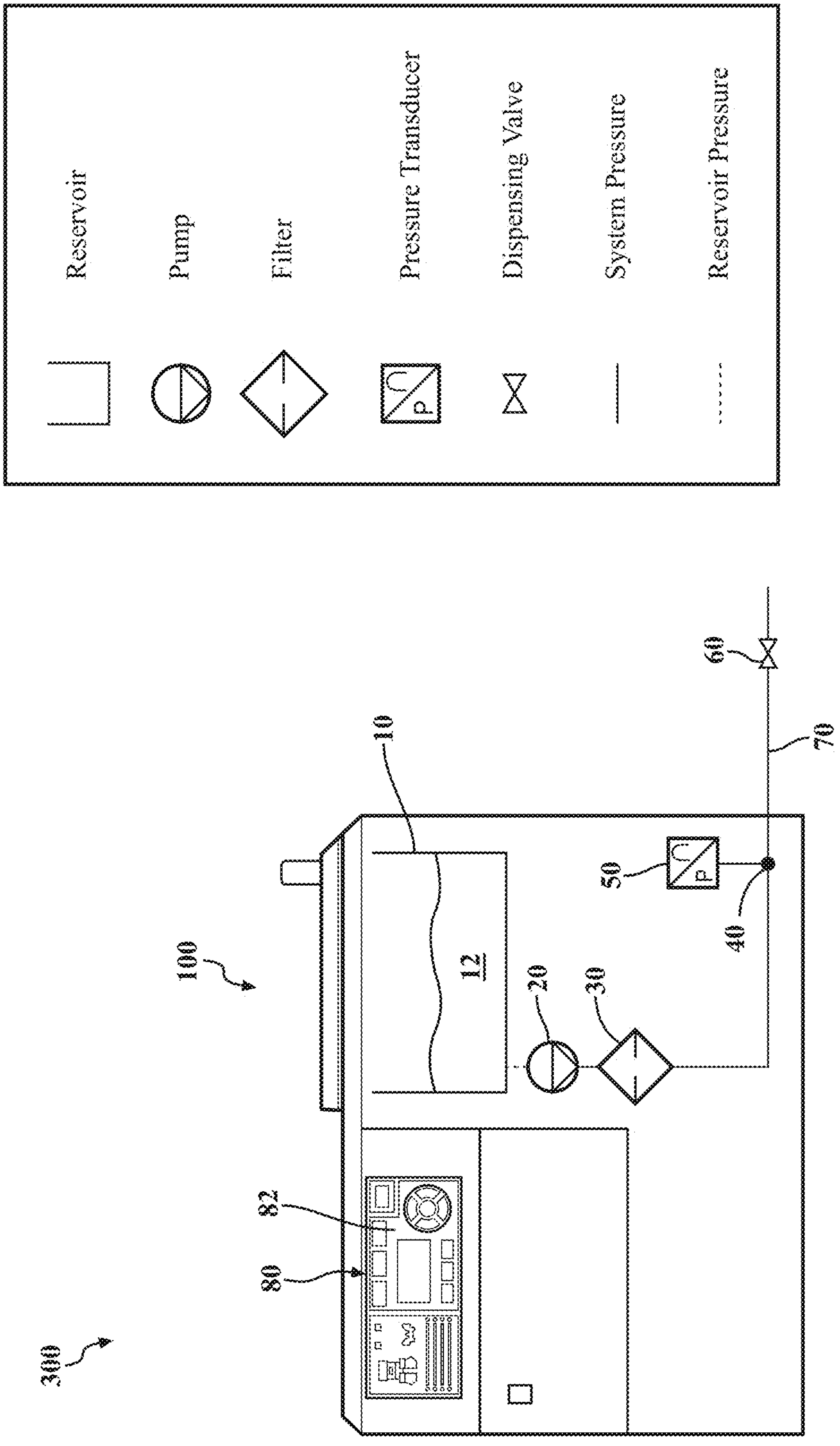
FIG. 1 depicts a schematic diagram of a system, according to one or more embodiments shown and described herein.
Figure 2:
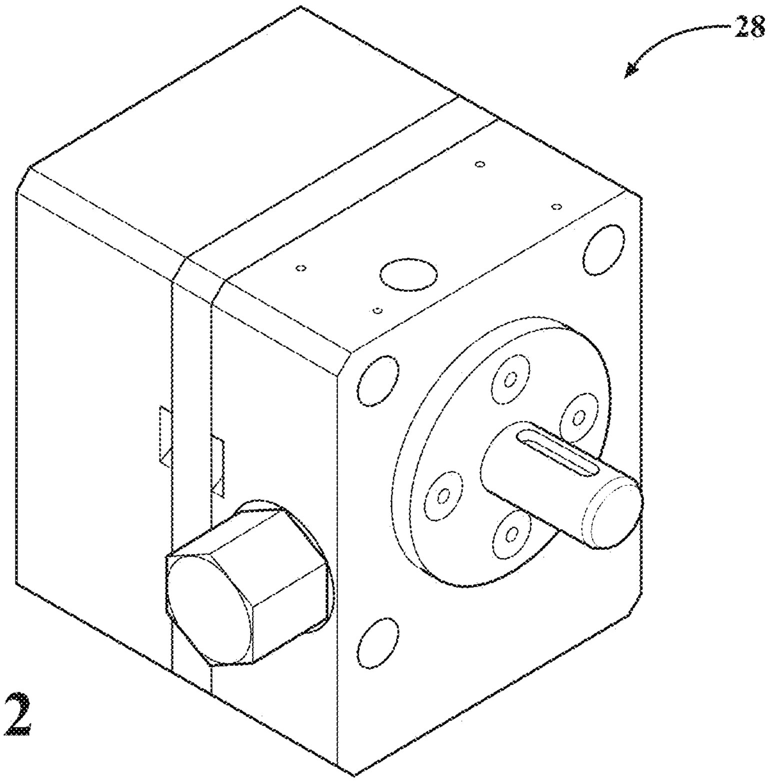
FIG. 2 depicts a perspective view of an exemplary embodiment of a gear pump for the system of FIG. 1, according to one or more embodiments shown and described herein.
Figure 3:
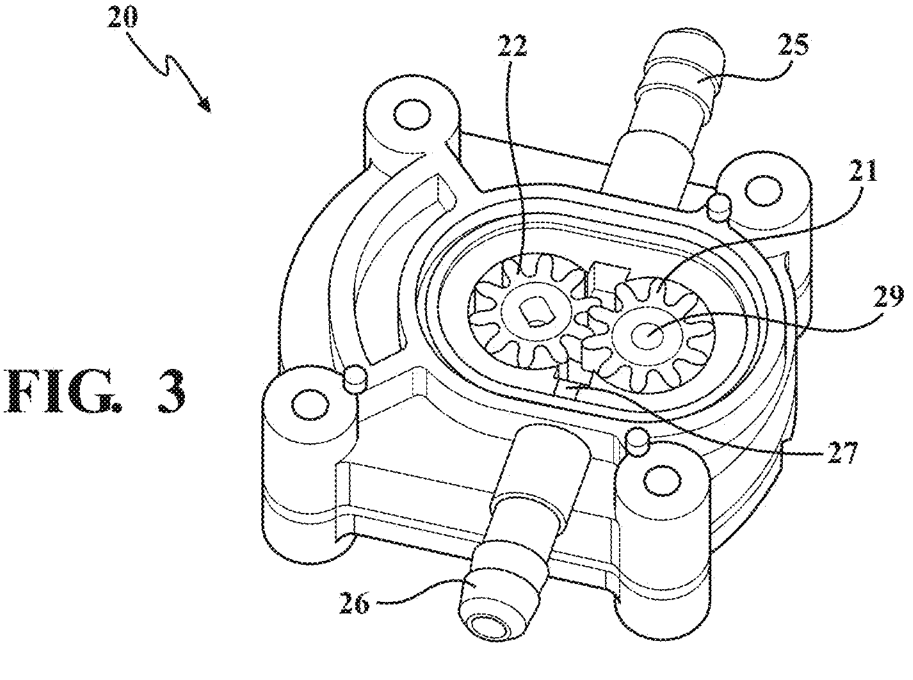
FIG. 3 depicts a perspective view of an exemplary internal structure of the gear pump for the system of FIG. 1, with a portion of an outer structure removed to show the internal structure of the gear pump, according to one or more embodiments shown and described herein.

Referring to FIG. 1, a fluid supply assembly 100 may have a system 300 including a fluid supply 10, a gear pump 20, a filter 30, a pressure transducer 50, and a dispensing valve 60. The fluid supply 10 may store fluid 12 and the fluid 12 may be dispensed through a dispensing line 70. The fluid 12 may flow into the gear pump 20, which is rotated by a motor (not shown). An exemplary gear pump is shown as 28 in FIG. 2. FIG. 3 shows an exemplary internal structure of the gear pump 20 with a portion of an outer structure removed to show the internal structure. Any type of a gear pump with rotational gears may be used with the present invention. This includes pumps wherein the "gears" do not look like traditional toothed gears but may have various lobed shapes.

Referring to FIG. 3, the gear pump 20 may include a motor that is coupled to one of gears 21, 22 and rotates the gears 21, 22. The motor may drive the gear pump 20 by rotating a shaft 29 that is coupled to one of the gears 21, 22. The gears 21, 22 may be toothed gears. In some embodiments, the gear 21 may be coupled to and rotated by the shaft 29, and the gear 21 may rotates the gear 22. A revolution counter 27 may be an inductive proximity sensor used to count a number of revolutions of the gears 21, 22 as they rotate to determine the number of pump revolutions and pump speed. In an embodiment, the revolution counter 27 may be configured to count a number of revolutions of the shaft 29, one or both of the gears 21, 22, or of the motor driving the pump. Alternatively, the revolution counter 27 may count the passage of gear teeth on one of the gears 21, 22 so as to determine revolutions or partial revolutions. Any type of detector or method may also be used to determine the revolutions or partial revolutions of the gear pump.

The gear pump 20 may include an inlet 25 and an outlet 26 coupled to the dispensing line 70 (FIG. 1). The fluid 12 flowing from the fluid supply 10 may flow into the gear pump 20 through the inlet 25 and flow out through the outlet 26 to generate fluid flow in the system 300. The gear pump 20 may have a long life span and be made of hard materials such as tool steel or hardened stainless steel, for example in the range of hardness from 50 to 80 Rc.

Figure 4:
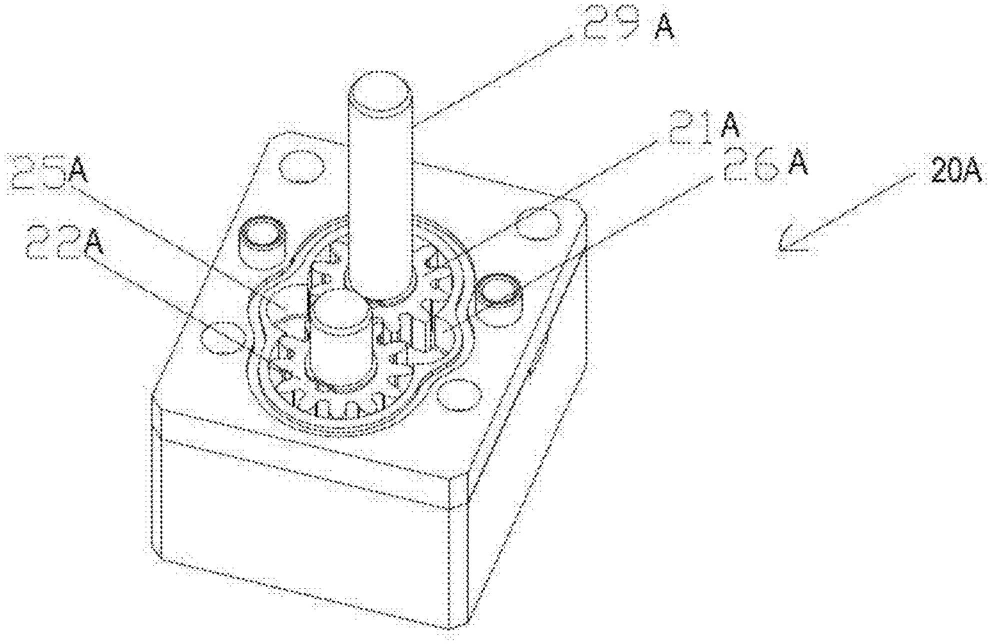
FIG. 4 depicts a perspective view of another exemplary internal structure of a gear pump for the system of FIG. 1, with a portion of an outer structure removed to show the internal structure of the gear pump, according to one or more embodiments shown and described herein.
Figure 5:
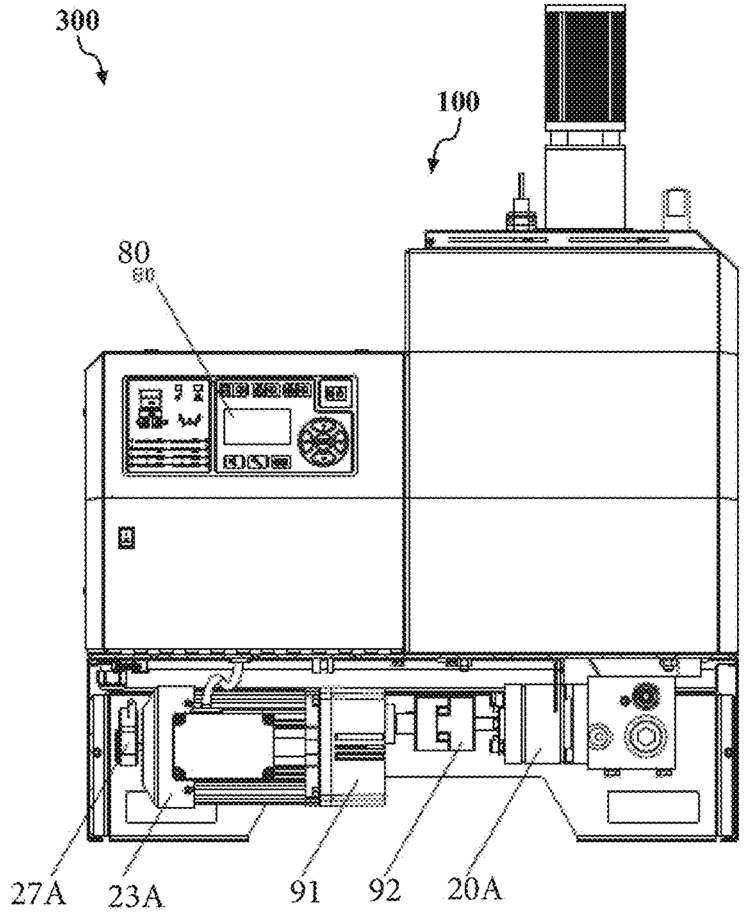
FIG. 5 depicts a schematic diagram of the system of FIG. 1, with a portion of an outer structure removed to show an exemplary internal structure of a fluid supply assembly, according to one or more embodiments shown and described herein.

Referring to FIGS. 4 and 5, alternative to the gear pump 20 described above in conjunction with FIG. 3, a gear pump 20A may be used. The gear pump 20A may include a motor 23A that is coupled to one of gears 21A, 22A and rotates the gears 21A, 22A. The gear pump 20A may include an inlet 25A and an outlet 26A coupled to the dispensing line 70 (FIG. 1). A revolution counter 27A may be an encoder that outputs a fixed number of pulses per revolution to determine the number of pump revolutions and pump speed. Rotations of the gear pump 20A may be counted via the encoder or a pulse counter mounted to a shaft 29A prior to gear reduction which drives the gear pump 20A. The encoder mounted to the shaft 29A then is coupled to a gear reducer 91 which has an output shaft 92. The output shaft 92 is then directly coupled to the gear pump 20A which delivers fluid.

Referring back to FIG. 1, the fluid 12 flows into the filter 30, and further flows down toward the dispensing valve 60 from which the fluid 12 is dispensed. The pressure transducer 50 may be coupled to the dispensing line 70 to sense pressure in the system 300. In an embodiment, the pressure transducer 50 may measure the pressure at the outlet 26 of the gear pump 20. Many typical systems would include a pressure relief valve coupled to the dispensing line 70 to release pressure in the system. Unlike such systems, the disclosed embodiment does not require a bypass line or a pressure relief valve. Typically, a bypass line may connect the fluid supply 10 and the dispensing line 70 through the pressure relief valve such that the pressure relief valve may allow the fluid 12 to return to the fluid supply 10 to maintain a set desired pressure in the system. In a system where the bypass line exists, the present methods for measuring fluid flow may still be utilized by closing the pressure relief valve such that the bypass line is not utilized. When the bypass line is closed, the fluid 12 may not be returned to the fluid supply 10. Another way to utilize the methods for measuring fluid flow in the system having the bypass line is to set the pressure relief valve 40 to maintain a pressure higher than the maximum allowable pressure, such that the fluid 12 may not flow toward the bypass line except in exceptional cases. In both cases with a system having a bypass line, the system pressure may be controlled by modulating the pump speed of the gear pump 20. Therefore, the methods for mearing fluid flow may be utilized even when the system includes the bypass line.

The fluid supply assembly may include a controller 80 that may process, store, and/or control the fluid supply assembly. The controller 80 may provide information to the user or receive input from the user through a user interface 82 communicatively coupled to the controller 80. The user interface 82 may be either wired or wirelessly coupled to the controller 80. The user interface 82 may include a display that may provide flow results in the system 300 to a user graphically and/or numerically. For example, the display may provide flow results in numbers or images indicative of numerical values or quantities of the flow results. The images may be graphs, charts, or the like. The flow results may be displayed over time to show stability of flow and/or proximity of flow in the system 300. In embodiments, the user interface 82 may include a speaker that may provide flow results to a user in sound.

The controller 80 may comprise a processor and a non-transitory electronic memory to which various components are communicatively coupled. In some embodiments, the processor and the non-transitory electronic memory and/or the other components are included within a single device. In other embodiments, the processor and the non-transitory electronic memory and/or the other components may be distributed among multiple devices that are communicatively coupled to each other. The controller 80 may include the non-transitory electronic memory that stores a set of machine-readable instructions (e.g., software). The processor may execute the machine-readable instructions stored in the non-transitory electronic memory. The non-transitory electronic memory may comprise RAM, ROM, flash memories, hard drives, or any device capable of storing machine-readable instructions such that the machine-readable instructions can be accessed by the processor. The controller 80 may control speed of the gear pump 20 by modulating a motor speed signal based on the feedback from the pressure transducer 50 to control the gear pump 20 to operate at a speed necessary to maintain a specific pressure.

The controller 80 may determine the flow results which may be displayed on the display. For example, the flow results may be obtained, used, and/or calculated by the controller 80. The flow results may include dispensed adhesive weight or volume or other information associated with flow in the system 300. The flow results may be indicative of stability of flow and proximity of flow to acceptable standards. In embodiments, the flow results may be totalized. For example, the flow results may be totalized for various intervals including products, minutes, cases, hours, days, shifts, months, or the like. The flow results may be stored in the memory of the controller 80 for certain intervals. The flow results may be compared to each other and a result of the comparison may be displayed on the display.

The controller 80 may determine whether the flow results satisfy a flow standard over a period of time. The controller 80 may determine that the flow results do not meet the flow standard when the flow results are higher or lower than the flow standard. In embodiments, the controller may determine the flow results do not satisfy the flow standard when the flow results are a certain value higher or lower than the flow standard. Based on the determination, the controller 80 may display alarms and/or notifications on the display when the flow results do not satisfy the flow standard. The alarms or notifications may involve a light stack. The alarms or notifications may involve sound provided by the speaker. The controller 80 may communicate the flow results to the fluid supply assembly 100, a parent machine, or other machines or components communicatively coupled to the system 300 via email, text, or other network-based methods.

As noted hereinabove, the fluid supply assembly 100 may deliver the fluid 12 at a predictable rate based on the speed of the gear pump 20. The fluid supply assembly 100 may provide information available to the user. The information may include a total fluid dispensed in a period, a dispense rate over a period, a total product count over a period, and a fluid per product, which will be discussed later. These parameters may be set or reset via the user interface 82 and/or by an external fieldbus command that may come from a machine or other supervisory controller. The information further includes setup parameters for measuring fluid flow including, encoder pulses per revolution or gear tooth count, pump displacement (cc), fluid density (g/cc), maximum product gap (seconds) indicating the time gap between the product to which fluid is applied. The fluid density may be calculated by the controller 80 based on weight and duration of a timed dispense. The weight and duration of the timed dispense may be entered via the user interface 82.

Figure 6:
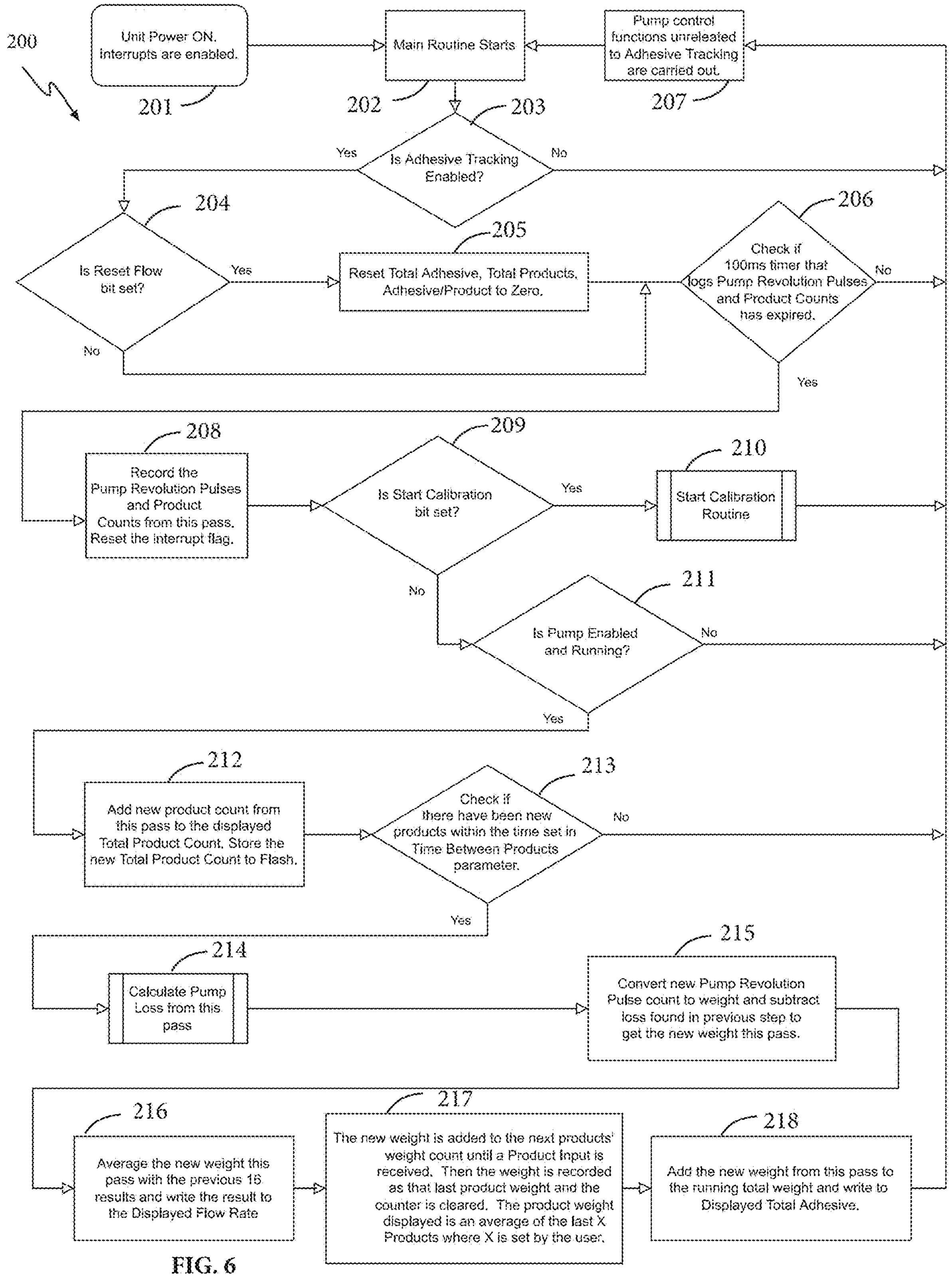
FIG. 6 depicts a flowchart of a method that may be performed by the system of FIG. 1, according to one or more embodiments shown and described herein.

Referring to FIG. 6, a flow chart of an exemplary method 200 for measuring fluid flow of fluid supply assembly 100 is depicted. The method may be used in a closed loop control mode that eliminates a bypass line.

At step 201, the power of the fluid supply assembly 100 is on and interrupts are enabled. The interrupts may be used to detect or count the number of gear teeth, to receive inputs of the number of product count, and/or other inputs.

At step 202, the main routine starts. The gear pump 20 may be enabled to start rotating and the revolution counter may start to count the number of revolutions of at least one of the elements of the gear pump 20 or the elements coupled to the gear pump 20, such as the shaft 29, the gears 21, 22, the motor, and the like.

At step 203, the controller 80 may determine whether fluid tracking is enabled. When the fluid tracking is enabled (Yes at step 203), step 204 is followed to determine whether a reset flow bit is set. When the fluid tracking is not enabled (No at step 203), step 207 is followed and pump control functions unrelated to the fluid tracking may be carried out. After step 207, the method returns to step 202 where the main routine starts.

At step 204, when the reset flow bit is set (Yes at step 204), step 205 is followed and the controller 80 may reset total amount of fluid, total product counts, and amount of fluid per product to zero. When the reset flow bit is not set (No at step 204), the controller 80 may skip step 205 and step 206 is followed.

At step 206, the controller 80 may determine whether a timer for a set time for this pass, for example, 100 milliseconds (ms), has passed. During the set time, the number of revolutions of the gear pump 20 and the product count may be logged. The number of revolutions may be updated and matched with the product count inputs every pass, (e.g., 100 ms). When the set time expires (Yes at step 206), step 208 follows. When the set time has not expired (No at step 206), step 207 follows and the method returns to step 202.

At step 208, the controller 80 may record the number of revolutions of the gear pump 20 and product counts during the set time. Interruption flag may be reset at step 208, and step 209 follows.

At step 209, the controller 80 determines whether a start calibration bit is set. When the start calibration bit is set (Yes at step 209), the calibration routine may start at step 210 and step 207 may follow after the calibration routine. The calibration routine at step 210 may include calculating an internal bypass of the gear pump 20 at several pressure levels. The gear pump 20 may be operated to maintain a given pressure level for a given period of time while no fluid is being dispensed. The method of measuring fluid flow in the system 300 may approximate the flow of fluid that has flowed through the gear pump 20 by counting the number of revolutions of the gear pump 20 and subtracting estimated losses in the gear pump 20. While counting the number of revolutions of the gear pump 20 provides an estimate of flow rate, the accuracy of this estimate depends on the amount of the internal bypass in the gear pump 20. The loss in the gear pump 20 may result from the internal bypass in the gear pump 20 or the amount of fluid that slips through the gear pump 20 unrelated to its rotation. The internal bypass is a function of pump clearances, system pressure, pump speed, and fluid viscosity. The effects of the internal bypass may be considerable for applications of fluid that combine low flow, high pressure, and low fluid viscosity, and may cause large discrepancies in flow measurement. Empirical analysis of these factors shows that the internal bypass may be accurately described by a power function, where the internal bypass is proportional to pressure, and proportional to the pump speed raised to a power. The proportional coefficient and power coefficient of this equation both may depend on viscosity and pump clearances, and may be calculated for the specific pump and fluid viscosity.

In some embodiments, the calibration routine may be run without dispensing fluid and runs for a set time, for example, about 18 minutes. The fluid supply may be prepared and the dispensing valve 60 may be closed. Pressure may be built to three different set points. For example, the pressure may be maintained at 10, 25, and 40 bar. The pressure may be held for 5 minutes at each pressure set point using closed loop pressure control. A delay (e.g., 1 minute) may be inserted between each set point change for the pressure to stabilize before recording data for each pressure set point. Since there is no dispensing, any rotation of the gear pump 20 is assumed to compensate for losses. During this time, the number of revolutions of the gear pump 20 is counted and converted to weight of fluid to determine the internal bypass loss at each pressure set point. An average pump revolution is also recorded at each pressure set point. The internal bypass loss at each pressure set point is converted to loss per pressure unit. Since the coefficients are dependent on the fluid viscosity, the calibration routine should be repeated for any change in fluid. Pump wear may also influence the coefficients as well as fluid types.

The following formulas to calculate power regression coefficients may use the data associated with the internal bypass loss, including the average pump revolution (x) and the loss per pressure set point (y), where n is the number of data points, which is 3, for example. Using the following formulas, a proportional coefficient A and a power coefficient B may be updated to calculate internal bypass loss based on a power regression equation which will be discussed later.

$$\text{mean: } \overline{\ln x} = \frac{\sum \ln x_i}{n},\ \overline{\ln y} = \frac{\sum \ln y_i}{n}$$

$$\text{trend line: } y = Ax^B,\ B = \frac{S_{xy}}{S_{xx}},\ A = \exp(\overline{\ln y} - B\overline{\ln x})$$

$$S_{xx} = \sum(\ln x_i - \overline{\ln x})^2 = \sum \ln x_i^2 - n \cdot \overline{\ln x}^2$$

$$S_{xy} = \sum(\ln x_i - \overline{\ln x})(\ln y - \overline{\ln y}) = \sum \ln x_i \ln y_i - n \cdot \overline{\ln x}\,\overline{\ln y}$$

Using the above formulas, the coefficients A and B may be calibrated or updated to calculate internal bypass loss based on a power regression equation which will be discussed later.

Still referring to FIG. 6, at step 209, when the start calibration bit is not set (No at step 209), step 211 follows to determine whether the gear pump is enabled and running. When the gear pump 20 is enabled and running (Yes at step 211), step 207 follows and flows back to step 202. When the gear pump 20 is not enabled and not running (No at step 211), step 212 follows.

At step 212, new product count received over this pass (e.g., 100 ms set time period) is added to the total product count, and the total product count is updated. The total product count may be displayed on the display of the user interface 82 graphically and/or numerically. The total product count is a total number of products to which fluid is applied. Step 213 follows after step 212.

At step 213, the controller 80 may determine whether there have been new products within a time, for example, the maximum product gap time. When there has not been a product count increase within the maximum product gap (i.e., there has been no delay) (No at step 213), the number of revolutions of gear pump 20 within this pass (e.g., 100 ms set time period) may be ignored and step 207 follows. When there has been a product count increase (Yes at step 213), the pump loss may be calculated from this pass at step 214.

At step 214, the pump loss (e.g., internal bypass loss) from this pass is calculated. The average pump loss may be calculated for each pass.

In some embodiments, the internal bypass loss is calculated based on a power regression equation as the following formula using variables for the pump speed and fluid pressure at the outlet 26 of the gear pump 20.

$$\text{Loss} = A * (\text{Pressure}) * (\text{Pump speed})^B$$

The coefficients A and B may be defaulted, for example, to A=1.0, B=0.13. The coefficients may be based on testing with a new pump without wear. A least squares best fit method may be used to calculate the coefficients. The coefficients A and B may also be manually entered into the user interface. As discussed above in step 210, the coefficients A and B may be recalculated to fit the system setup and particular pump using the calibration routine. During normal operation (e.g., during dispensing fluid), the internal bypass loss is calculated based on real time pump speed and pressure, and is deducted from the flow estimated to reach the dispensing valve 60.

At step 215, the internal bypass loss is converted to a weight loss based on at least the pump displacement (cc) and the fluid density (g/cc). The weight loss may be subtracted from the weight calculated to obtain the fluid weight dispensed during this pass.

At step 216, the average of the fluid weights counted for the past 16 passes (e.g., over the past 16 seconds in case one pass is 100 ms) is calculated. The average of the fluid weights is converted to the dispense rate (grams/hour). The dispense rate may be provided in audible, visual, or audiovisual form in the user interface 82. The dispense rate is displayed, for example, on the display of the user interface 82 graphically and/or numerically.

At step 217, the user interface 82 may allow the user to input the number of products used to calculate average fluid per product. The fluid consumed between product counts is summed and divided by the number of products selected for the average calculation resulting in an average fluid weight per product.

At step 218, the new fluid weight from the current pass is added to the total fluid dispensed, which may be displayed, for example, on the display of the user interface 82 graphically and/or numerically. In embodiments, the total fluid dispensed may be provided in audible, visual, or audiovisual form in the user interface 82.

After step 218, step 207 follows and the process goes back to step 202, where the main routine starts.

Various modifications of the present disclosure, in addition to those shown and described herein, will be apparent to those skilled in the art of the above description. Such modifications are also intended to fall within the scope of the appended claims.

It is also to be understood that this disclosure is not limited to the specific aspects and methods described herein, as specific components and/or conditions may, of course, vary. Furthermore, the terminology used herein is used only for the purpose of describing particular aspects of the present disclosure and is not intended to be limiting in any way. It is noted that the above embodiments may be applied to estimate any fluid flow, and may not be limited to adhesive.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing description is illustrative of particular embodiments of the disclosure, but is not meant to be a limitation upon the practice thereof. The following claims, including all equivalents thereof, are intended to define the scope of the disclosure.

The invention claimed is:

1. A system comprising:
- a fluid supply assembly comprising:
  - a fluid supply supplying fluid;
  - a dispensing valve configured to dispense the fluid;
  - a dispensing line connecting the fluid supply to the dispensing valve;
  - a gear pump comprising a motor and a gear configured for rotation by the motor to provide a flow of fluid from the fluid supply to the dispensing line;
  - a revolution counter configured to determine a number of revolutions of an element of the gear pump;
  - a pressure transducer coupled to the dispensing line, the pressure transducer configured to sense pressure in the system, and
  - a controller comprising a processor and a memory, wherein the controller is configured to control a flow of the fluid based on the pressure sensed by the pressure transducer and modulating a speed of the gear pump, wherein to control the flow of the fluid the controller is configured to:
    - cause the gear pump to provide the fluid from the fluid supply to the dispensing line for a first calibration period;
    - obtain, from the pressure transducer, the pressure in the system;
    - cause the gear pump to maintain the pressure at a first calibration pressure for the first calibration period;
    - obtain, from the revolution counter, a first number of revolutions of the element of the gear pump for the first calibration period while the dispensing valve is closed; and
    - calculate a first loss based on the first number of revolutions and the first calibration pressure.

2. The system of claim 1, wherein to cause the gear pump to maintain the pressure at the first calibration pressure for the first calibration period, the controller is configured to modulate the speed of the gear pump.

3. The system of claim 2, wherein the dispensing line and the fluid supply are fluidly coupled without a bypass line for bypassing fluid back to the fluid supply from the dispensing line.

4. The system of claim 2, wherein the fluid supply assembly comprises a pressure relief valve coupled to the dispensing line, wherein the pressure relief valve is configured to remain closed for the first calibration period.

5. The system of claim 1, wherein the controller is configured to:
- cause the gear pump to provide the fluid from the fluid supply to the dispensing line for a second calibration period;
- obtain, from the pressure transducer, the pressure in the system;
- cause the gear pump to maintain the pressure at a second calibration pressure for the second calibration period;
- obtain, from the revolution counter, a second number of revolutions of the element of the gear pump for the second calibration period while the dispensing valve is closed; and
- calculate a second loss based on the second number of revolutions and the second calibration pressure.

6. The system of claim 5, wherein the controller is configured to calculate one or more loss coefficients in the system based on the first loss and the second loss.

7. The system of claim 6, wherein the one or more loss coefficients are calculated using a least squares best fit method.

8. The system of claim 5, wherein the controller is configured to:
- cause the gear pump to provide the fluid from the fluid supply to the dispensing line for a third calibration period;
- obtain, from the pressure transducer, the pressure in the system;
- cause the gear pump to maintain the pressure at a third calibration pressure for the third calibration period;
- obtain, from the revolution counter, a third number of revolutions of the element of the gear pump for the third calibration period while the dispensing valve is closed; and
- calculate a third loss based on the third number of revolutions and the third calibration pressure.

9. The system of claim 1, wherein the controller is configured to execute an adhesive tracking process when adhesive tracking is enabled, wherein to execute the adhesive tracking process comprises the controller being configured to:
- determine that a reset bit is set;
- reset a total adhesive consumption and a total product count;
- add an adhesive consumption and a product count to the total adhesive consumption and the total product count until an adding period ends;
- ignore the number of revolutions of the element when the product count has not increased within a maximum product gap time period;
- calculate an average number of revolutions of the element over a past time period when the product count has increased within the maximum product gap time period;
- calculate a weight dispensed during the past time period based on the average number of revolutions and an average pressure in the system over the past time period;
- calculate a loss based on the average number of revolutions and the average pressure in the system over the past time period and one or more loss coefficients;
- convert the loss to a weight loss based on a fluid density of the fluid; and
- calculate an average total weight by subtracting the weight loss from the weight dispensed.

10. The system of claim 9, wherein to execute the adhesive tracking process comprises the controller being configured to:
- convert the average total weight counted for the past time period to an average dispensing rate;
- cause a display to display the average dispensing rate;
- calculate an average product count over the past time period based on the average dispensing rate;
- calculate an adhesive weight per product based on the average product count and the average dispensing rate over the past time period;

cause the display to display the adhesive weight per product; and add the adhesive weight to the total adhesive consumption.

11. The system of claim 1, further comprising a display communicatively coupled to the controller, wherein the display is configured to display a flow result of the system.

12. The system of claim 11, wherein the flow result comprises at least one of a dispensed fluid weight or a dispensed fluid volume.

13. The system of claim 11, wherein the flow result comprises a total flow of the fluid for an interval of time.

14. The system of claim 1, further comprising a display communicatively coupled to the controller, wherein the display is configured to display a result of a comparison between a first flow result and a second flow result.

15. The system of claim 1, wherein the controller is configured to determine a total flow of the fluid for an interval of time and store the total flow in the memory.

16. The system of claim 1, wherein the controller is configured to determine whether a flow result in the system satisfies a flow standard over a period of time.

17. The system of claim 1, wherein the controller is configured to:

determine that a flow result in the system does not satisfy a flow standard over a period of time; and output a notification indicating that the flow result does not satisfy the flow standard.

18. The system of claim 1, wherein the fluid is an adhesive.

19. The system of claim 1, wherein the element of the gear pump is at least one of the motor, the gear, or a shaft.

* * * * *